April 23, 1963   W. T. FLEMING   3,086,405
MECHANICAL POWER TRANSMISSION UNIT
Filed June 7, 1961
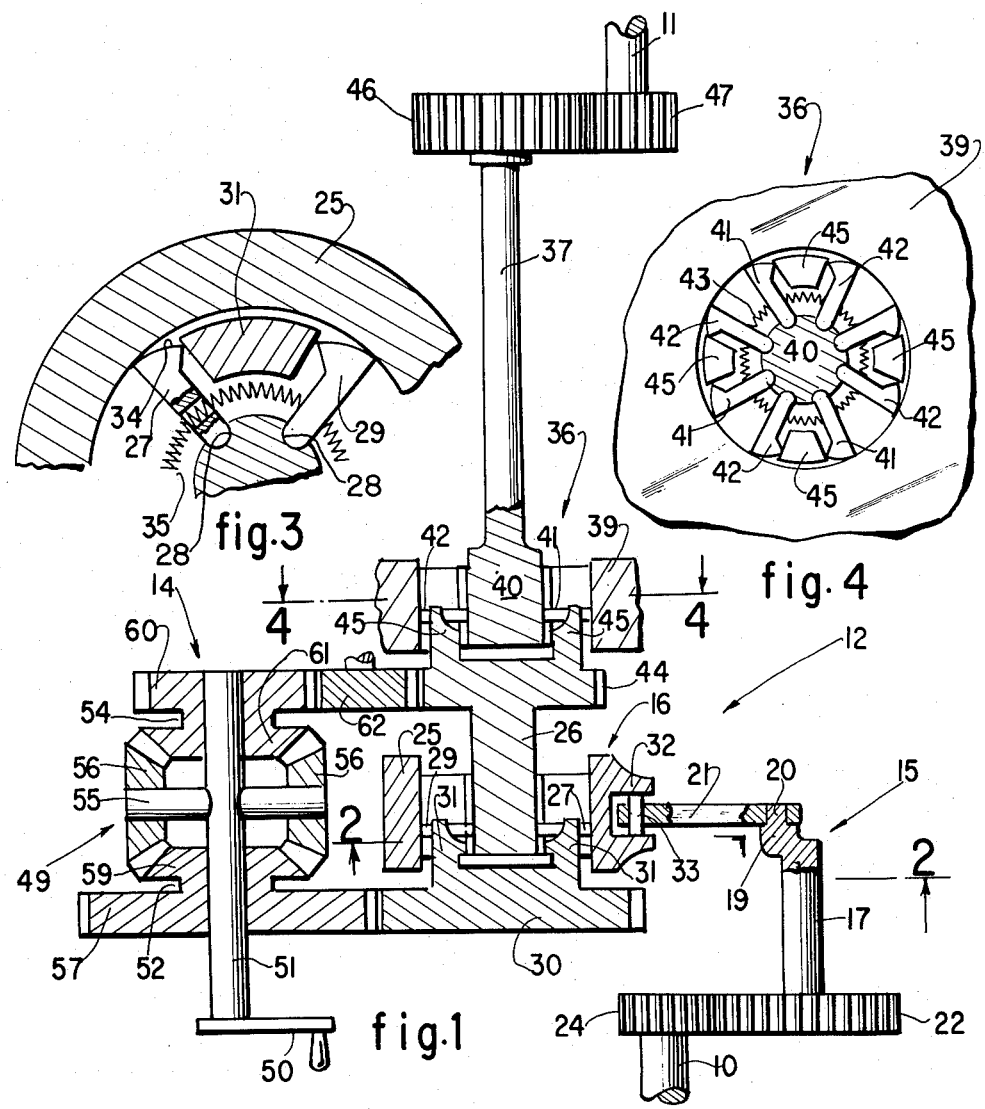
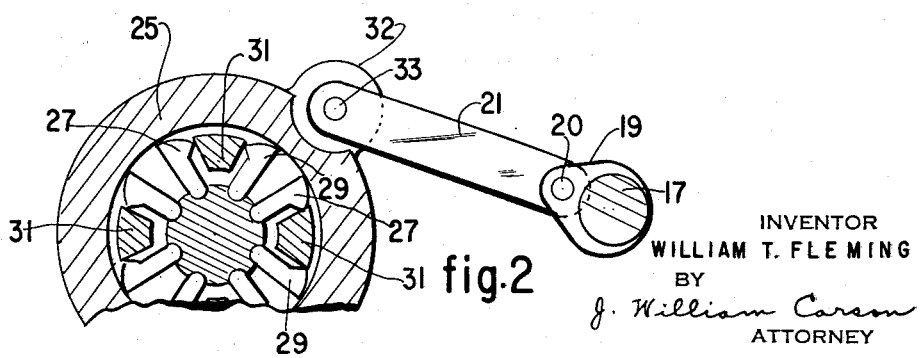
INVENTOR
WILLIAM T. FLEMING
BY
J. William Carson
ATTORNEY

United States Patent Office 3,086,405
Patented Apr. 23, 1963

3,086,405
MECHANICAL POWER TRANSMISSION UNIT
William T. Fleming, Boonton, N.J., assignor to Specialties Development Corporation, Belleville, N.J., a corporation of New Jersey
Filed June 7, 1961, Ser. No. 115,359
6 Claims. (Cl. 74—388)

The present invention relates to units for transmitting mechanical power, and, more particularly, to such units wherein the output member follows the motion of a control member and exerts a torque greater than that applied to the control member.

There have been developed in the past, mechanical power transmission units of this type wherein the power of a driven shaft is transmitted to an output shaft through friction clutches which are actuated by a control member.

These friction clutches operate on the principle of the capstan and include a band of high coefficient of friction material wrapped about the driven shaft. One end of the band is attached to the control member and the other end is attached to the output member. The control member applies a tensile force to the band drawing the band tightly about the driven shaft to provide frictional engagement therebetween. The band rotates with the driven shaft and transmits the torque of the driven shaft to the output shaft.

Because these device rely on the frictional force developed between the band and the driven shaft, the driving connection between the driven shaft and the output shaft is dependent upon the magnitude of the torque on the control member, the materials used, the condition of the surfaces of the band and the driven shaft, the lubricant used and the temperature thereof, and the speed of the driven shaft. Also, the time required to establish a slip free connection between the driven and output shafts is further dependent upon the rate at which the control torque is applied. These devices, therefore, tend to be unstable and inconsistent in operation and thus are not satisfactory for many applications.

Accordingly, an object of the present invention is to provide a mechanical power transmission unit not subject to the aforementioned difficulties.

Another object is to provide such a unit which has rapid response and transmits power without slippage.

Another object is to provide such a unit wherein the clutch between the driven and output members responds only to the presence or absence of a control torque.

Another object is to provide such a unit wherein the driving connection between the driven and output members is independent of variations in the torque applied to the control member.

Another object is to provide such a unit wherein the output member is positively locked to the driven member by movement of the control member.

Another object is to provide such a unit wherein the driven and output members are automatically unlocked when the motion of the control member stops.

Another object is to provide such a unit wherein the driven and output members are moved into and out of engagement by forces exerted by the driven member.

A further object is to provide such a unit which is compact, light, of simple construction, inexpensive to manufacture, and contains a minimum number of parts.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a mechanical power transmission unit including the combination of a continuously driven oscillating input power member, a rotatable output power member, a wedge member positioned between the power members and mounted on one of the power members to be movable between a first position wherein the members are free to rotate with respect to each other and a second position wherein the members are locked against relative rotation in one direction, a rotatable control shaft, and control means responsive to the rotation of the shaft for placing the wedge member in the second position only during rotation of the shaft.

A preferred embodiment of the invention has been chosen for purposes of illustration and description, and is shown in the accompanying drawing, forming a part of the specification, wherein:

FIG. 1 is a schematic, longitudinal, sectional view of a mechanical power transmission unit in accordance with the present invention.

FIG. 2 is a sectional view taken along line 2—2 on FIG. 1.

FIG. 3 is an enlarged view of a portion of FIG. 2 illustrating details of the mechanism therein.

FIG. 4 is a sectional view taken along line 4—4 on FIG. 1.

Referring to the drawing in detail, there is shown one embodiment of a mechanical power unit in accordance with the present invention which generally comprises a rotating input power shaft 10, a rotatable output power shaft 11, a power transmission unit 12, and a transmission control unit 14.

The transmission unit 12 includes a crank mechanism 15 driven by the input shaft 10 for converting the rotary motion of the shaft 10 into oscillatory motion, and a clutch 16 for selectively transmitting unidirectional motion from the output of the crank mechanism to the output shaft 11.

The crank mechanism 15 includes a rotary shaft 17, a head 19 mounted on one end of the shaft 17 provided with a pin 20 positioned eccentrically with respect to the axis of the shaft 17, and a connecting rod 21 mounted on the pin 20. The shaft 17 is provided with a gear 22 mounted on the opposite end thereof from the head 19, and the shaft 10 is provided with a gear 24 intermeshed with the gear 22 to drive the shaft 17.

The clutch 16 includes an outer race-like power input member 25, a central power output shaft 26, a plurality of wedges or sprags between the outer member 25 and the shaft 26 including sprags 27 for transmitting clockwise motion and sprags 29 for transmitting counterclockwise motion, and a sprag positioning gear 30 having a plurality of control fingers 31 extending between the sprags. The sprags 27 and 29 are arranged in opposing pairs and are pivotally mounted in sockets 28 provided on the shaft 26 to extend outwardly toward the inner surface of the input member 25. The clutch input member 25 is provided with a forked extension 32, and a pin 33 extends through the connecting rod 21 and is secured between the forks of the extension 32 to transmit oscillatory motion from the connecting rod 21 to the input member 25.

As shown in FIG. 3, the sprags 27 are formed with an outer surface 34 which is curved in a manner such that the distance from the axis of rotation of the sprag to various points on the surface 34 gradually increases from one edge of the sprag to the other. Therefore, the distance from the axis of the shaft 26 to the most distant point on the surface 34 varies with the rotational position of the sprag 27. Thus the sprags 27 can be pivoted from a position wherein they are out of contact with the clutch input member 25 to a position wherein they wedge against the input member to lock the shaft 26 to the input member 25 when the input member is moving in a clockwise direction. A contracting coil spring 35 threaded through each sprag holds the sprags in their sockets and urges them toward an upright position, as viewed. The sprags 29 are similarly formed but are mounted in the reverse position to enable them to be positioned to lock the shaft 26 to the input member 25 when the input member is moving in a counterclockwise direction.

The shaft 26, when driven by the input member 25, drives the output shaft 11 through a reverse torque locking clutch 36 and a torsion bar 37.

The reverse torque locking clutch 36 includes a stationary outer race-like member 39, a central shaft 40, a plurality of sprags 41 for preventing counter clockwise torque from being transmitted from the torsion bar 37 to the shaft 26, a plurality of sprags 42 for preventing clockwise torque from being transmitted from the torsion bar 37 to the shaft 26, a compression coil spring 43 for holding the sprags in position, and a sprag positioning gear 44 mounted on the shaft 26 and having a plurality of control fingers 45 extending upwardly (as viewed in FIG. 1) between the outer race-like member 39 and the central shaft 40. The sprags 41 and 42 are arranged in opposing pairs to be controlled by common control fingers positioned therebetween.

The lower end of the torsion bar 37 is joined to the shaft 40, and a gear 46 provided at the upper end meshes with a gear 47 on the output shaft 11.

The transmission control unit 14 includes a differential gear assembly 49 and an input control lever 50. The differential gear assembly comprises a central input shaft 51, a pair of gear carrying output members 52 and 54 rotatably mounted on the shaft 51, a cross shaft 55 rigidly attached to the shaft 51 and extending radially outwardly between the output members 52 and 54, and a beveled spur gear 56 mounted for rotation on each end of the cross shaft 55.

The output member 52 is positioned below the cross shaft 51 and is formed with a large diameter spur gear 57 at its lower end and a bevel gear 59 at its upper end. The output member 54 is positioned above the cross shaft 51 and is formed with a small diameter spur gear 60 at its upper end and a bevel gear 61 at its lower end. The beveled spur gears 56 are each intermeshed with the bevel gears 59 and 61, and the spur gear 57 engages the sprag positioning gear 30. The spur gear 60 is interconnected with the sprag positioning gear 44 of the reverse torque locking clutch 36 by means of an idler gear 62.

In operation, the input power shaft 10 is driven in a counter clockwise direction, as viewed from above, by a source of mechanical power not shown and drives the crank mechanism 15 to impart oscillatory motion to the clutch input member 25. When the control lever 50 is stationary, the sprags 27 and 29 are in light frictional contact with the inner surface of the input member 25 and are prevented from moving into a locking position by the control fingers 31.

In order to transmit power from the input shaft 10 to the output shaft 11, the control lever 50 is rotated to cause the differential assembly 49 to rotate the control fingers 31 with respect to the shaft 26. As shown in FIG. 2, when the control fingers 31 are rotated clockwise with respect to the shaft 26, the sprags 29 are pivoted away from the clutch input member 25 and the sprags 27 are pivoted into contact with the member 25 so that they wedge against the member 25 when the member 25 moves in a clockwise direction and are free to pivot to a non-wedging position when the member 25 moves in a counterclockwise direction. The shaft 26 is thereby locked to the member 25 each time the member 25 moves clockwise and is released from the member 25 when the member 25 moves counterclockwise, whereby the shaft 26 is rotated clockwise in steps.

In like manner, when the control fingers 31 are rotated counterclockwise with respect to the shaft 26, the sprags 27 are pivoted away from the member 25 and the sprags 29 lock the shaft 26 to the member 25 during counterclockwise oscillation thereof to rotate the shaft 26 counterclockwise in steps.

The shaft 26 drives the sprag positioning gear 44 of the reverse locking clutch 36 thereby causing the control fingers 45 to engage one set of sprags 41 or 42 and rotate the shaft 40. As shown in FIG. 4, the sprags engaged by the control fingers 45 are pivoted away from the race-like member 39 and that the resulting motion imparted to the shaft 40 prevents the other set of sprags from being moved into wedging contact with the member 39. The stepped motion of the shaft 26 is thereby transferred through the clutch 36 and applied to the torsion bar 37.

In response to each application of torque, the torsion bar twists thereby storing a portion of the applied torque which is subsequently delivered to the output shaft 11 during the following period when the shaft 26 is stationary. Through this action, the torsion bar 37 averages the torque applied thereto and continuously drives the output shaft 11 through the gears 46 and 47. The reverse torque which the torsion bar 37 exerts upon the shaft 40 during the periods when the shaft 60 is stationary, causes the shaft 40 to rotate slightly with respect to the control fingers 45, forcing one set of sprags into locking engagement with the race-like member 39 to prevent any further rotation. Reverse torque is thus prevented from being transmitted through the clutch 36.

The direction of rotation of the output shaft 11 is controlled by the direction of displacement of the control fingers 31 with respect to the shaft 26, and this displacement is determined by the direction of rotation of the control lever 50. When the control lever 50, and the shafts 51 and 55 are rotated clockwise (as viewed from above), the output members 52 and 54 interconnected by the gears 56 are rotated in the same direction as the shaft 51 and effect rotation of the control fingers 31 in the counterclockwise direction with respect to the shaft 26. On the other hand, when the control lever 50 is rotated counterclockwise, clockwise rotation of the control fingers 41 with respect to the shaft 26 is effected.

The overall gear ratio from the gear 57 of the differential through the clutch 16 to the gear 60 is slightly less than unity whereby it is necessary for the control lever 50 to be continuously rotated in order to maintain the phase shift between the control fingers 31 and the shaft 26 which is required to maintain a driving connection through the clutch.

When the motion of the control lever 50 is stopped, the shaft 26 drives the output member 54 through the idler gear 62 and the output member 54 drives the member 52 through the spur gears 56 to rotate the sprag positioning gear 30. The sprag positioning gear 30 is rotated in the same direction as the shaft 26, however, because of the overall gear ratio, the gear 30 is driven at a slower rate and the locked sprags are contacted by the slower moving control fingers and are moved out of the locked position to place the clutch 16 in a neutral position.

From the foregoing, it will be seen that the present invention provides an improved mechanical power transmission unit which responds rapidly to the movement of a control member and provides a positive driving connection between a driven and an output member in response to a minimum torque on the control member.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a mechanical power transmission unit, the combination of a continuously driven oscillating input power member, a rotatable output power member, a wedge member positioned between said power members and mounted on one of said power members to be moveable between a first position wherein said members are free to rotate with respect to each other and a second position wherein said members are locked against relative rotation in one direction, a rotatable control shaft, and control means responsive to the rotation of said shaft for placing said wedge member in said second position only during rotation of said shaft.

2. In a mechanical power transmission unit, the combination of a continuously driven oscillating input power member, a rotatable output power member, a wedge member positioned between said power members and mounted on one of said power members to be movable between a first position wherein said members are free to rotate with respect to each other and a second position wherein said members are locked against relative rotation in one direction, a rotatable control shaft, and control means operatively connected to said control shaft for moving said wedge member into said second position when rotation of said shaft is initiated and for maintaining said wedge member in said second position during the rotation of said shaft and for moving said wedge member into said first position when the rotation of said shaft ceases.

3. In a mechanical power transmission unit, the combination of a continuously driven oscillating input power member, a rotatable output power member, a wedge member positioned between said power members and mounted on one of said power members to be movable between a first position wherein said members are free to rotate with respect to each other and a second position wherein said members are locked against relative rotation in one direction, a wedge positioning member between said power members, a rotatable control shaft, and control means for positioning said wedge positioning member relative to said power member carrying said wedge member in response to rotation of said control shaft to place said wedge member in said second position when said shaft is rotating and in said first position when said shaft is stationary.

4. Apparatus according to claim 3, wherein said controlling means includes a differential gear mechanism having an input member driven by said control shaft and having a first output member in connection with said wedge positioning member and a second output member in connection with said wedge carrying power member.

5. In a mechanical power transmission unit, the combination of a continuously driven oscillating input power member, a rotatable output power member, first and second wedge members positioned between said power members and mounted on said output member, said first wedge member being movable into a position wherein said power members are locked against relative rotation in one direction, said second wedge member being movable into a position wherein said power members are locked against relative rotation in the other direction, a wedge positioning member between said power members for selectively placing said wedge members in their locking position, a rotatable control shaft, and control means for positioning said wedge positioning member in response to rotation of said control shaft to place said first wedge member in locking position when said control shaft is rotated in one direction and to place said second wedge member in locking position when said control shaft is rotated in the other direction.

6. Apparatus according to claim 5, wherein said controlling means includes a differential gear mechanism having an input member driven by said control shaft and having a first output member in connection with said wedge positioning member and a second output member in connection with said output power member.

No references cited.